(12) United States Patent
Halstead et al.

(10) Patent No.: US 8,166,620 B2
(45) Date of Patent: May 1, 2012

(54) CONNECTOR

(75) Inventors: Graham Halstead, Walton le Dale (GB); Robert Emmett, Wray (GB)

(73) Assignee: Balltec Limited (GB)

( * ) Notice: Subject to any disclaimer, the term of this patent is extended or adjusted under 35 U.S.C. 154(b) by 677 days.

(21) Appl. No.: 11/918,366

(22) PCT Filed: Apr. 12, 2006

(86) PCT No.: PCT/GB2006/001345
§ 371 (c)(1),
(2), (4) Date: Dec. 2, 2008

(87) PCT Pub. No.: WO2006/109065
PCT Pub. Date: Oct. 19, 2006

(65) Prior Publication Data
US 2009/0241304 A1    Oct. 1, 2009

(30) Foreign Application Priority Data
Apr. 14, 2005  (GB) .................................. 0507518.9

(51) Int. Cl.
*F16B 7/14* (2006.01)

(52) U.S. Cl. .......... 24/453; 403/322.2; 411/348; 24/607

(58) Field of Classification Search ............ 24/453, 24/606, 607; 411/348; 403/322.2
See application file for complete search history.

(56) References Cited

U.S. PATENT DOCUMENTS

| | | |
|---|---|---|
| 2,062,628 A | 12/1936 | Yannetta |
| 2,182,797 A | 12/1939 | Dillon |
| 2,226,304 A | 12/1940 | Dillon |
| 2,283,975 A | 5/1942 | Dillon |
| 3,653,688 A | 4/1972 | Sakakibara |
| 3,951,238 A | 4/1976 | Dent et al. |
| 4,893,810 A | 1/1990 | Lee |
| 5,366,313 A * | 11/1994 | LaBarre ................ 403/108 |

FOREIGN PATENT DOCUMENTS

| | | |
|---|---|---|
| EP | 0 156 575 | 4/1989 |
| EP | 0 461 819 | 12/1991 |
| EP | 0 663 314 | 7/1995 |
| GB | 367 757 | 8/1930 |
| GB | 666415 | 2/1952 |
| GB | 772 203 | 4/1957 |
| GB | 2 155 577 | 9/1985 |
| GB | 2 167 801 | 6/1986 |
| RU | 2184284 | 6/2002 |
| SU | 458662 | 1/1975 |
| SU | 779688 | 11/1980 |
| WO | 2004 055394 | 7/2004 |

\* cited by examiner

*Primary Examiner* — James Brittain
(74) *Attorney, Agent, or Firm* — Salter & Michaelson

(57) ABSTRACT

A subsea connector comprises a female element (1) defining a parallel bore (2) adapted to receive a male element (3). First releasable locking means are disposed between elements (2) and (3) and comprise a sprung cage (6) in which balls (5) are retained for movement in tapered grooves circumferentially spaced around element (3). As the cage moves relative to element (3) balls (5) protrude from the cage to a greater or lesser extent to lock the elements together. Second locking means prevent relative movement between elements (1) and (3) in a locking release direction of the first releasable locking means. These second locking means comprise lock balls retained in an apertured body disposed between elements (1) and (2).

19 Claims, 4 Drawing Sheets

CONNECTOR

TECHNICAL FIELD

The present invention relates to a connector and particularly, but not exclusively, to a connector comprising a male element received within a female element and friction based locking means disposed between them.

BACKGROUND OF THE INVENTION

In a known connector of the above type, the locking means comprise machined grooves circumferentially spaced around the male element in which locking balls retained in a cage surrounding the male element are adapted to run. The balls are forced out into contact with the female element when the male element is received therein and applying a tension load to the two elements causes the balls to grip the female element more tightly.

Under certain conditions, the connector may be subject to a decrease, or complete removal of the tension load, that is normally present. In this instance, and assuming the connector is in a near vertical state, its own self weight could cause it to return to the same condition as when it was at the point of insertion. If the tension load was suddenly reapplied it could cause displacement between the male element and the female elements.

Where the connector is being used as a subsea connector and the female element is mounted on a mud mat, it is usual for the female element to be allowed to pivot in one axis, with respect to the mud mat base. This is to allow displacement of the mud mat base, with respect to the connector, to compensate for the unevenness of the sea bed. The connector may be subject to a decrease or complete removal, of the tension load that is normally present. In this instance, the mud mat and attached connector, which is normally suspended above the seabed could fall back to the seabed. Because of the weight of connector and attached links, it could cause the connector to pivot downward.

If there was a failure of the cage that maintains displacement with respect to the body, on complete removal of the tension load, this could allow its own weight to cause it to return to the same condition as when it was inserted. This could be followed by the connector pivoting downward, which could cause displacement between the male element and female element, It is an object of the invention to overcome these potential disadvantages.

SUMMARY OF THE INVENTION

According to the present invention, there is provided a connector comprising a first connector element and a second connector element, first releasable locking means disposed between the connector elements enabling the elements to be connected together and second locking means operative to prevent relative movement between the elements in a locking release direction of the first releasable locking means to prevent unlocking when a load applied to the connector is removed.

In a preferred embodiment of the invention, the first connector element is a male connector element and the second connector element is a female connector element adapted to receive the first connector element. The first releasable locking means advantageously comprises a cage in which a plurality of balls are retained for movement in a row of respective tapered grooves circumferentially spaced around the male connector element. As the male element is inserted into the female element, the balls are wedged between the two to lock them together. Application of a tension load to the elements increases the force with which the balls are gripped between the two elements and therefore the force connecting the two elements together. The second locking means advantageously comprises one or more lock balls retained in an apertured body disposed between the first and second elements. Means are provided enabling independent movement of the lock balls. These means comprise a cylindrical body which coaxially surrounds the cage of the first locking means and also comprises apertures through which respective lock ball(s) of the second locking means extend(s). The cylindrical body is urged towards the bore of the second connector element by resilient means, advantageously a compression spring.

DESCRIPTION OF THE DRAWINGS

In order that the invention may be more clearly understood, one embodiment thereof will now be described, by way of example, with reference to the accompanying drawings in which.

DETAILED DESCRIPTION

Figure 1:
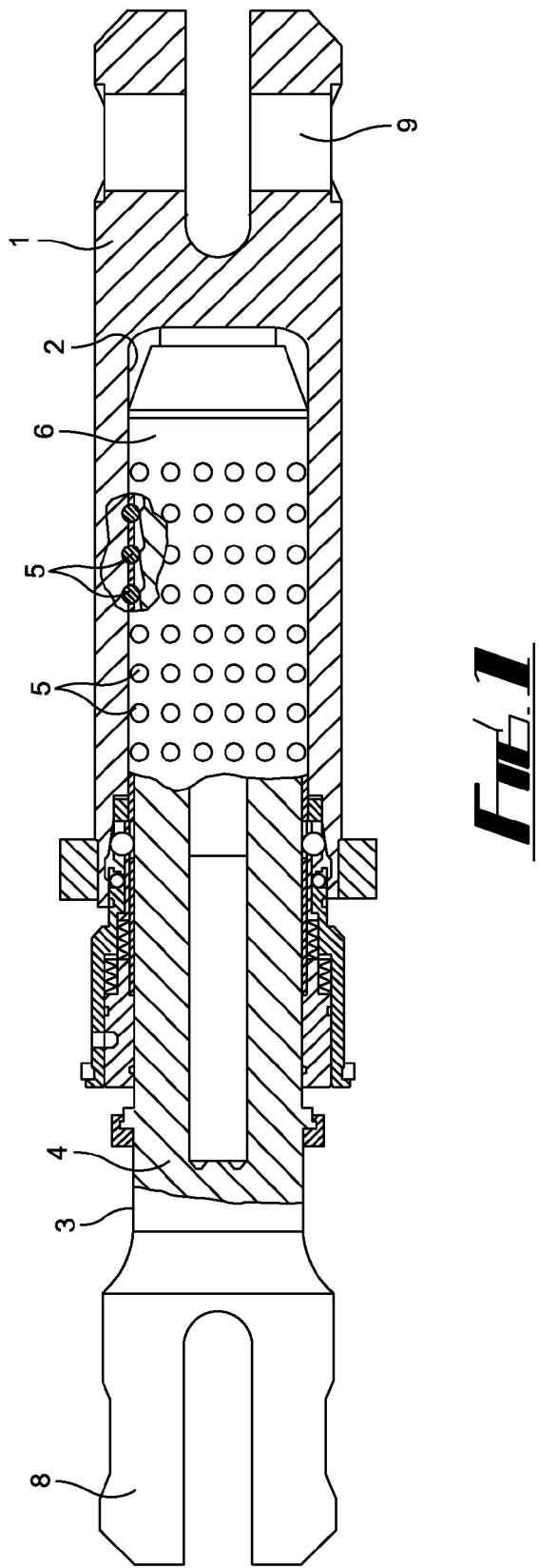
FIG. 1 shows a view in part longitudinal section of a connector.

Referring to FIG. 1, the connector comprises a female element 1, defining a parallel bore 2 adapted to receive a male element 3. The connector is intended for a subsea connection but may be employed in other areas. The male element 3 comprises a body 4 into which a plurality of circumferential rows of axially extending tapered slots are machined. A plurality of balls 5 retained in a cylindrical cage 6 are disposed in respective slots for movement up and down those respective slots. The cage 6 comprises a plurality of rows of counterbored holes 7 corresponding to respective rows of tapered slots machined in the body 4. The diameter of these counterbored holes 7 is such as to permit corresponding balls 5 to protrude therethrough. The cage 6 is sprung with respect to the body 4. This causes movement of the cage 6 with respect to the body 4 which causes movement of the balls 5 up and down the tapered slots and protrusion of the balls 5 through corresponding holes 7 to a greater or lesser degree.

The male element 3 has a padeye or clevis 8 at its end remote from the female element 1. This padeye or clevis 8 enables attachment via chain links. Shackles or similar (not shown) to a chain, wire, synthetic rope or similar (also not shown). This latter, in turn, may be attached to, for example, an oil rig in the case of the connector being used as a subsea connection. Other types of attachment may be used. Similarly, the female element 1 also comprises a padeye or clevis 9 enabling attachment via chain links, shackles or similar to chain, wire, synthetic rope or similar (also not shown). This in turn may be attached to a suction pile driven into the seabed in the case of a subsea connection. Other types of attachment may be used.

Figure 2:
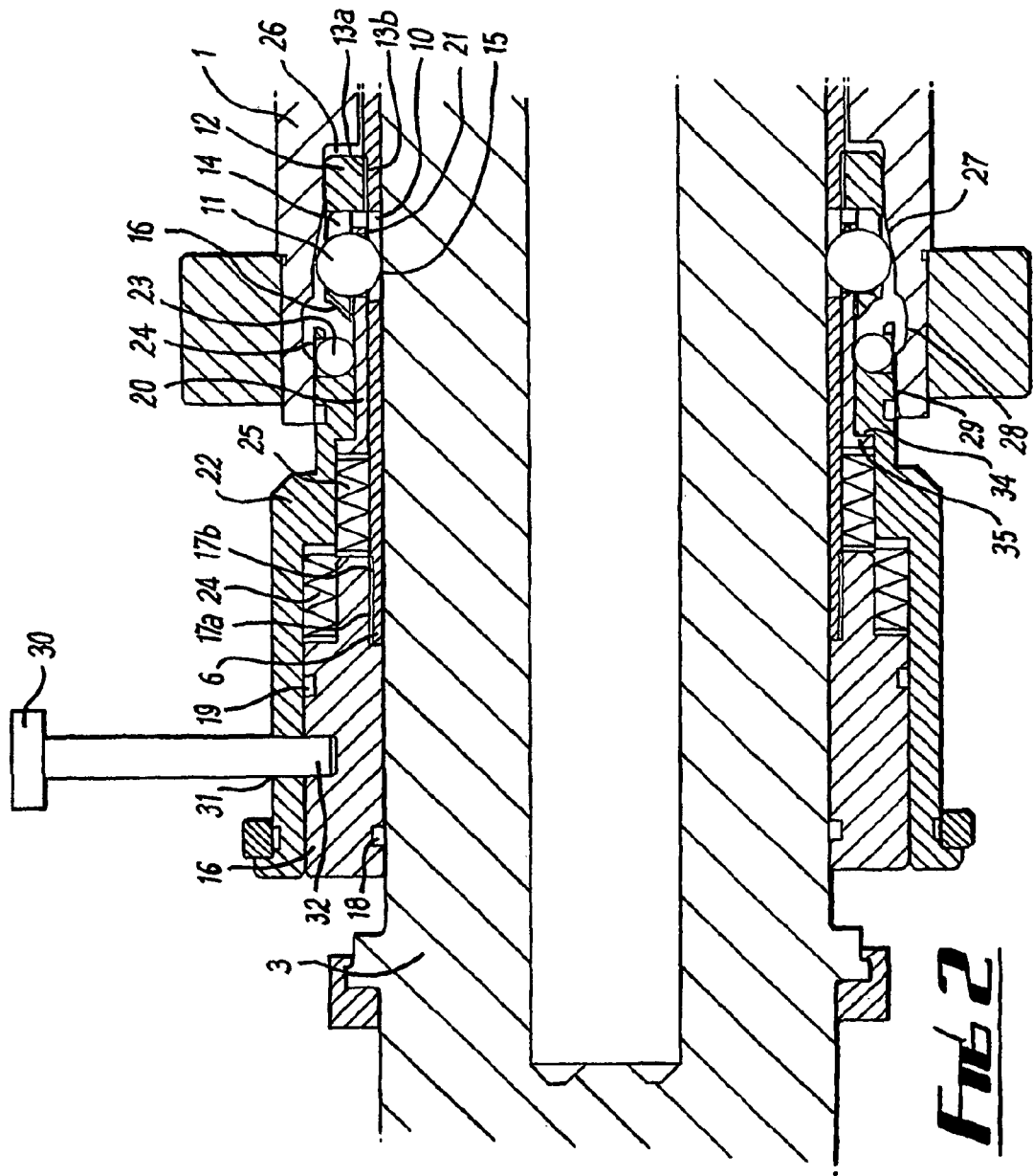
FIG. 2 shows a view in section of part of the connector of FIG. 1 to a larger scale.

Referring additionally to FIG. 2, the cylindrical cage 6 also comprises a plurality of circumferentially spaced longitudinally extending slots 10 through which respective lock balls 11 extend to contact the male element 3. A cylindrical body 12 coaxially surrounds cage 6 and is connected thereto by means of an internal screwthreaded portion 13a on the body 12 and a complementary externally screwthreaded portion 13b on the cage 6. The body 12 defines a row of circumferentially spaced holes 14 through which respective balls 11 extend. On its face remote from the screwthread 13a, a taper 15 is formed which leads to a radiused portion 16. A further cylindrical body 16 coaxially surrounds the male element 3 and the cage 6 to which it is connected by means of complementary respective internal and external screwthreaded portions 17a and 17b on the body 16 and the cage 6. Seals 18 and 19 are housed in grooves formed in the body 16.

A further cylindrical body 20 coaxially surrounds cage 6. This body 20 comprises a row of circumferentially spaced holes 21 through which respective balls 11 extend to enable independent movement of those balls 10. A further cylindrical body 22 coaxially surrounds body 20 and body 16. This body 22 comprises a row of circumferentially spaced internally counterbored holes 24 to retain respective ones of a plurality of lock balls 23 having a diameter less than that of the diameter of balls 11. Compression springs 24 and 25 are provided. Spring 24 is constrained to act between abutment faces on bodies 16 and 22 and spring 25 is constrained to act between abutment faces on bodies 16 and 20.

Moving from right to left in FIG. 2, the parallel bore 2 in female element 1 leads to a parallel counterbore 26 which accommodates cylindrical body 12, a tapered bore 27 accepting balls 11, a recessed bore 28 accepting balls 23 and a parallel bore 29 accepting body 22. To retain body 22 in a retained relative position to body 16 a pin 30 extends through a bore 31 in body 22 and into a recess 32 in body 16. A seal 33 is disposed in a groove in body 22 to act between that body and element 1.

In operation, pre-deployment, the body 22, which constitutes an outer sleeve, is retained relative to body 16 which constitutes a sleeve housing for seals 18 and 19, by retaining pin 30. Body 22 in turn retains body 20 through abutment of the complementary steps 34 and 35 formed on bodies 22 and 20 and locks ball 11 and 23 are also held in a retracted state.

To make the connection, the male element 3 is inserted into the female element 1. The balls 5 which protrude through the cage 6, make contact with the wall of bore 24, the female element 1. As insertion continues, the balls 5 start to roll down respective corresponding tapered slots, carrying the sprung loaded cage 6 with them. When the balls 5 have moved sufficiently, to conform to the diameter of the female element bore 2, the male element 3 continues to slide into full engagement. The sprung loaded cage 6 ensures contact between the balls 5 and the bore 1 is maintained.

Once the connection is made, as a tension load is applied to the connector, the male element 3 starts to move slightly with respect to the female element 1, causing the balls 5, which are in contact with the wall of the female element bore 2, to roll up respective tapered slots, thus gripping the wall of the bore. As the tension load is increased, the grip load is also increased, thereby making a firm connection.

Figure 3:
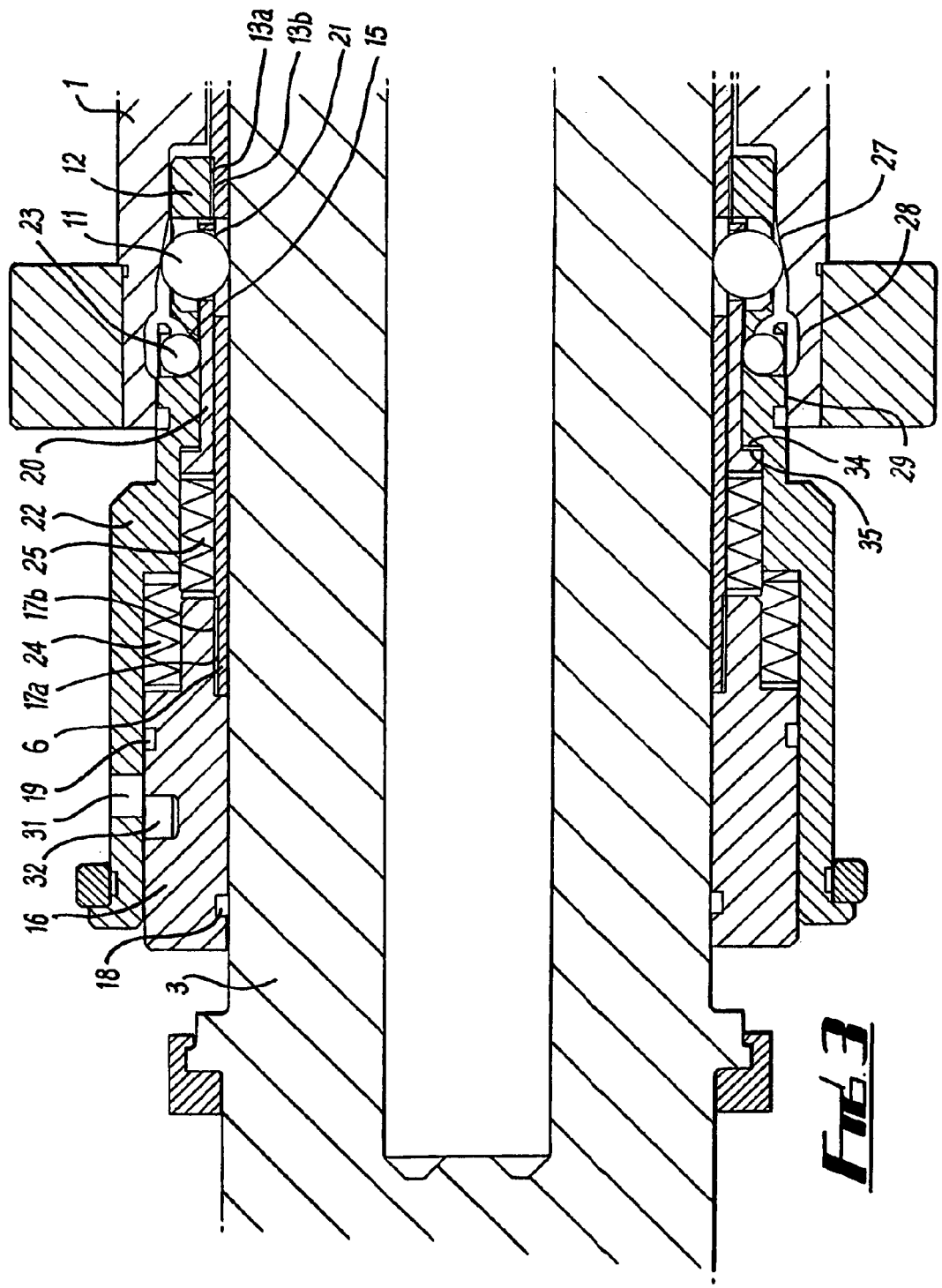
FIG. 3 shows a view in section of that part of the connector shown in FIG. 2 but in a different operational state.

Following insertion of the male element 3 into the female element 1, to connect the two elements the pin 30 is removed. Stored energy in springs 24 and 25 is released causing linear displacement of body 22 and body 20 with respect to body 16 as shown in FIG. 3.

Figure 4:
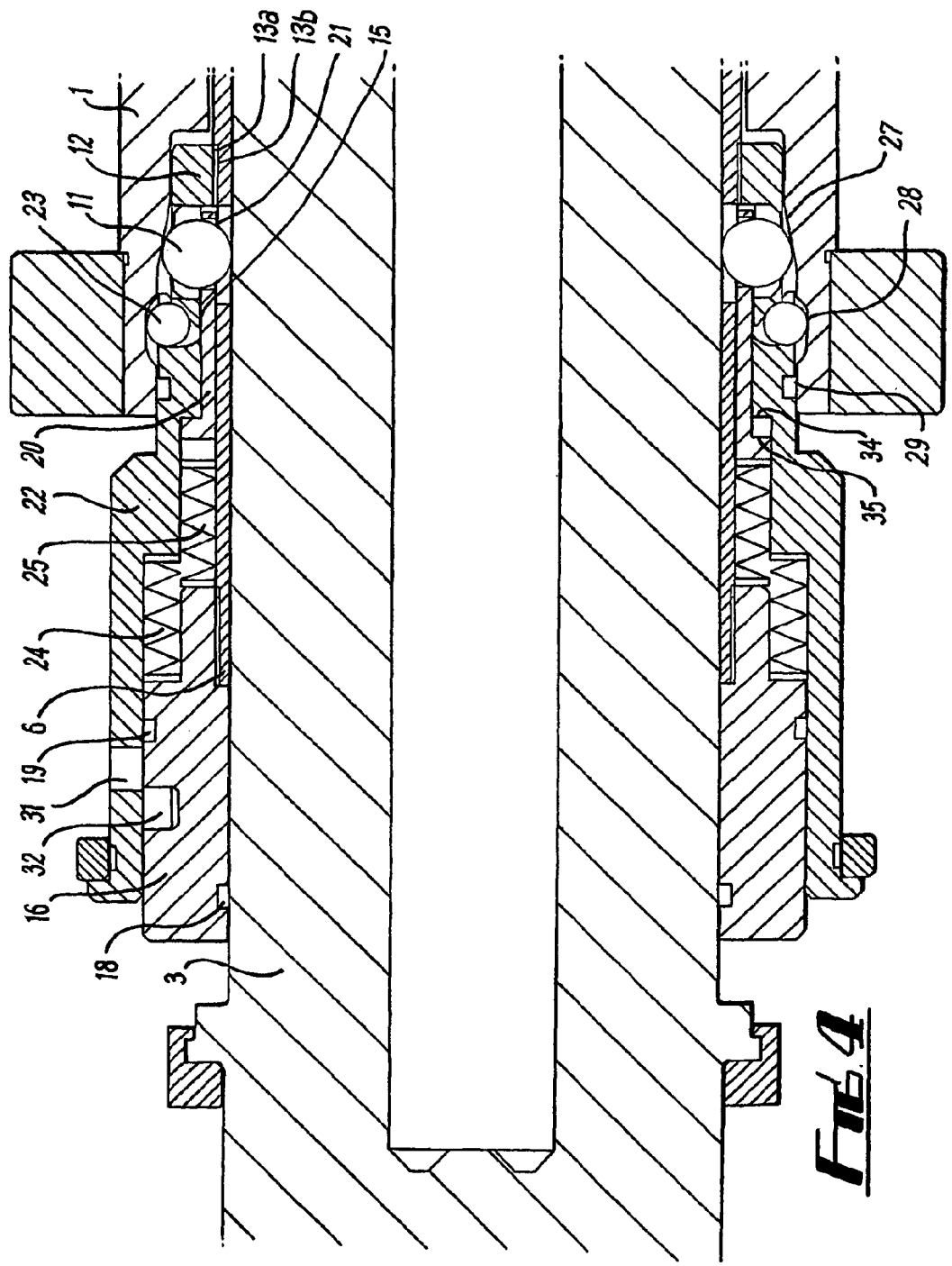
FIG. 4 shows a view in section of that part of the connector shown in FIGS. 2 and 3 but in a different operational state.

Displacement of body 22 causes radial displacement of lock balls 23, up the taper 15 on the face of body 12, thereby engaging lock balls 23 into the recessed bore 28 in element 1. At the same time, displacement of body 20 causes linear displacement of lock balls 11, thereby causing engagement of lock balls 11 in the tapered bore 27 in element 1 and the adjacent diameter of male connector 3 as shown in FIG. 4. As a tension load is applied to the connector a firm connection is made between the male element and the female elements 3 and 1. This causes a small linear displacement of the male element 3 as it begins to grip, with respect to the female element 1. This displacement acts also on cage 6, body 16, body 12, lock balls 23, body 22, spring 24 and spring 25. As this linear displacement occurs, the lock balls 23 are allowed freedom to move longitudinally, along recessed bore 28 in element 1. Despite this linear displacement, the energy in spring 25, acting in the opposite direction, on body 20 maintains engagement of lock balls 11, to the taper bore 27 in element 1 and the adjacent diameter of element 3.

Lock balls 11 being engaged between the taper bore in element 1, and the adjacent diameter of element 3 generates a unilateral gripping force preventing inward linear displacement of element 3, with respect to element 1, but still allowing free outward linear displacement of element 3 with respect to element 1.

It will be appreciated that the above embodiments have been described by way of example only and that many variations are possible within the scope of the invention. For example, pin 30 and the associated apertures 31 and 32 could be dispensed with. This would result in an automatic deployment obviating the need for an ROV (Remotely Operated Vehicle) to remove the pin in marine application.

The invention claimed is:

1. A connector comprising a first connector element and a second connector element, a first releasable locking means disposed between the connector elements enabling the elements to be connected together and a second locking means disposed between the connector elements operative to prevent relative movement between the elements in a locking release direction of the first releasable locking means to prevent unlocking when a load applied to the connector is removed, wherein the first releasable locking means comprises a cage in which a plurality of balls are retained for movement in a row of respective tapered grooves circumferentially spaced around the first connector element and the second locking means comprises one or more lock balls retained in an apertured body disposed between the first and second connector elements and arranged to engage with a tapered bore in the second connector element.

2. A connector as claimed in claim 1, in which the first connector element is a male connector element and the second connector element is a female connector element adapted to receive the first connector element.

3. A connector as claimed in claim 2, in which, as the male connector element is inserted into the female connector element, the balls of the first locking means are wedged between the male and female connector elements to lock them together.

4. A connector as claimed in claim 1, in which application of a tension load to the elements increases the force with which the balls of the first locking means are gripped between the two elements and therefore the force connecting the elements together.

5. A connector as claimed in claim 1, in which means are provided enabling independent movement of the one or more lock balls of the second locking means.

6. A connector as claimed in claim 5 in which the means for enabling independent movement comprises a cylindrical body coaxially surrounding the cage of the first locking means and also comprising one or more apertures through which respective one or more lock balls of the second locking means extend.

7. A connector as claimed in claim 6, in which the cylindrical body is urged towards the bore of the second connector element by resilient means.

8. A connector as claimed in 7, in which the resilient means comprises a compression spring.

9. A connector as claimed in claim 6, in which a plurality of further lock balls are provided, retained in counterbored holes in a further cylindrical body between the first and second connector elements and arranged to be received into a recessed bore in the second connector element.

10. A connector as claimed in claim I suitable for making a subsea connection.

11. A connector comprising:
a first connector element;
a second connector element;
a first releasable locking mechanism disposed between the first and second connector elements for coupling the first and second connector elements together;
and a second locking mechanism operative to prevent relative movement between the first and second connector elements in a locking release direction of the first releasable locking mechanism to prevent unlocking when a load applied to the connector is removed;
said first releasable locking mechanism comprising a cage disposed about the first connector element and a plurality of balls retained by said cage and for movement in a row of respective tapered grooves circumferentially spaced around the first connector element;
said second locking mechanism comprising an apertured body and one or more lock balls retained in the apertured body, said apertured body disposed between the first and second connector elements, and said one or more locking balls arranged to engage with a tapered bore in the second connector element.

12. A connector as claimed in claim 11, in which the first connector element is a male connector element and the second connector element is a female connector element adapted to receive the male connector element.

13. A connector as claimed in claim 12, in which, as the male connector element is inserted into the female connector element; the balls of the first locking mechanism are wedged between the male and female connector elements to lock the male and female connector elements together.

14. A connector as claimed in claim 11, in which application of a tension load to the connector elements increases the force with which the balls of the first locking mechanism are gripped between the two connector elements and therefore the force connecting the connector elements together.

15. A connector as claimed in claim 11, further comprising a cylindrical body coaxially surrounding the cage of the first locking mechanism and also comprising one or more apertures through which respective one or more lock balls of the second locking mechanism extend.

16. A connector as claimed in claim 15, including a resilient member for urging the cylindrical body towards the bore of the second connector element.

17. A connector as claimed in claim 16, in which the resilient member comprises a compression spring.

18. A connector as claimed in claim 11, including a further cylindrical body and a plurality of further lock balls, said further cylindrical body having counterbored holes for retaining the further locking balls therein, said plurality of further lock balls constructed and arranged to be received into a recessed bore in the second connector element.

19. A connector as claimed in claim 11 suitable for making a subsea connection.

* * * * *